(12) United States Patent
Harvey

(10) Patent No.: US 10,936,701 B2
(45) Date of Patent: *Mar. 2, 2021

(54) METHOD AND SYSTEM FOR CONDITIONAL ACCESS VIA LICENSE OF PROPRIETARY FUNCTIONALITY

(71) Applicant: Twentieth Century Fox Film Corporation, Los Angeles, CA (US)

(72) Inventor: Ian E. Harvey, Lake Forest, CA (US)

(73) Assignee: TWENTIETH CENTURY FOX FILM CORPORATION, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/563,492

(22) Filed: Sep. 6, 2019

(65) Prior Publication Data

US 2019/0392116 A1 Dec. 26, 2019

Related U.S. Application Data

(63) Continuation of application No. 16/114,029, filed on Aug. 27, 2018, now Pat. No. 10,445,475, which is a
(Continued)

(51) Int. Cl.
*G06F 21/10* (2013.01)
*G06F 21/60* (2013.01)
(Continued)

(52) U.S. Cl.
CPC .......... *G06F 21/10* (2013.01); *G06F 21/554* (2013.01); *G06F 21/602* (2013.01);
(Continued)

(58) Field of Classification Search
CPC .......... H04N 21/2541; H04L 2209/603; H04L 2209/60; H04L 63/0428; G06F 21/10; G06F 21/602; G06Q 2220/18
See application file for complete search history.

(56) References Cited

U.S. PATENT DOCUMENTS 5,237,610 A 8/1993 Gammie et al.
8,615,650 B2 12/2013 Magis
(Continued)

FOREIGN PATENT DOCUMENTS

| JP | 5-145923 | 6/1993 |
| JP | 10-208385 | 8/1998 |
| JP | 11-31130 | 2/1999 |

OTHER PUBLICATIONS

The Extended European Search Report and Written Opinion, dated Aug. 23, 2019, in EP Application Serial No. 17744916.2.

*Primary Examiner* — Thaddeus J Plecha
(74) *Attorney, Agent, or Firm* — Farjami & Farjami LLP

(57) ABSTRACT

A method and system for securely and traceably enabling playing back of content on a playback device of a plurality of playback devices, in which each of the plurality of playback devices comprises a cryptographic function module (CFM). In one embodiment, the method comprises accepting a first input in the playback device from a content licensing agency; generating, in the device, a first output from the first input according to a proprietary cryptographic function using the CFM, the first output necessary to enable playback of the content by the playback device, the proprietary cryptographic function being one of a family of proprietary cryptographic functions executable by the CFM of each of the plurality of playback devices; and enabling the playback of the content by the device at least in part according to the first output.

18 Claims, 12 Drawing Sheets

Related U.S. Application Data continuation of application No. 15/006,878, filed on Jan. 26, 2016, now Pat. No. 10,061,905.

(51) Int. Cl.
  *H04N 21/254* (2011.01)
  *G06F 21/55* (2013.01)
  *H04L 29/06* (2006.01)

(52) U.S. Cl.
  CPC ..... *H04L 63/0428* (2013.01); *H04N 21/2541* (2013.01); *G06Q 2220/18* (2013.01); *H04L 2209/60* (2013.01); *H04L 2209/603* (2013.01)

(56) References Cited

U.S. PATENT DOCUMENTS

| | | | |
|---|---|---|---|
| 9,043,827 B1 | 5/2015 | Rapoport | |
| 9,215,505 B2 | 12/2015 | Le Pelerin | |
| 10,061,905 B2 * | 8/2018 | Harvey | H04N 21/2541 |
| 10,445,475 B2 * | 10/2019 | Harvey | G06F 21/602 |
| 2005/0190920 A1 * | 9/2005 | Ahonen | H04L 9/065 380/274 |
| 2008/0263624 A1 * | 10/2008 | Nakahara | G06F 21/10 726/1 |
| 2009/0063846 A1 * | 3/2009 | Baker | H04L 43/18 713/150 |
| 2009/0313480 A1 * | 12/2009 | Michiels | G06F 21/10 713/187 |
| 2010/0191975 A1 * | 7/2010 | Chase | H04L 63/0823 713/176 |
| 2011/0225417 A1 * | 9/2011 | Maharajh | H04L 65/4076 713/150 |
| 2013/0268759 A1 * | 10/2013 | Blankenbeckler | H04L 9/006 713/168 |
| 2014/0281502 A1 * | 9/2014 | Keung Chan | H04L 9/3263 713/157 |
| 2016/0147982 A1 * | 5/2016 | Sedayao | G06F 21/123 726/29 |
| 2016/0171186 A1 * | 6/2016 | Marking | H04L 63/126 713/190 |

* cited by examiner

METHOD AND SYSTEM FOR CONDITIONAL ACCESS VIA LICENSE OF PROPRIETARY FUNCTIONALITY

CROSS REFERENCE TO RELATED APPLICATIONS

The present application is a Continuation of U.S. application Ser. No. 16/114,029, filed Aug. 27, 2018, which is a Continuation of U.S. application Ser. No. 15/006,878, filed Jan. 26, 2016, now U.S. Pat. No. 10,061,905, which are hereby incorporated by reference in their entirety into the present application.

BACKGROUND OF THE INVENTION

1. Field of the Invention

The present invention relates to systems and methods for providing conditional access to protected content, and in particular to a system and method for providing access to protected content via execution of licensable functions.

2. Description of the Related Art

The digitization of audio visual media content such as television shows and movies has enabled viewers to purchase their own copies of such media content for personal enjoyment. Such media content may be disseminated via tangible media such as optical discs, or may be disseminated by downloading the digital media from a content server or kiosk to a writable medium for later playback. Unfortunately, the digitalization of such media content has also permitted large scale and widespread unauthorized dissemination and/or use. Such unauthorized dissemination and/or use deprive providers of the audio visual media content the economic benefit of authoring such material.

Of course, the unauthorized dissemination and/or use of content constitutes a copyright infringement of the content by the person or entity disseminating or using the content in an unauthorized way. Hence, one way of preventing such unauthorized use is to aggressively enforce such copyrights. One of the problems with such enforcement is that such copyright infringements are typically highly decentralized and distributed, and filing suit for copyright infringement against such entities is far more costly than any damages that may be recovered, even statutory damages. For example, an individual may be guilty of copyright infringement for an unauthorized viewing or dissemination of a movie, but the statutory damages for such infringement do not justify the effort and expense of filing a lawsuit against that individual. Further, such actions may not be effective with respect to derivative works, and may require evidence which is difficult to obtain.

Other enforcement strategies are also problematic. For example, one such strategy is to attempt to enjoin entities that offer software or hardware that is capable of decoding and decrypting protected content with a lawsuit. The problem is that it can be difficult to initiate a cause of action against such entities until the infringement itself has already occurred (and when it has, an unprotected copy has typically already been disseminated), and if the software or hardware can be used in non-infringing ways, the action itself may be unsuccessful.

Further, successful digital rights management (DRM) schemes require coordination among content providers, manufacturers and licensors of the DRM scheme itself. When the scheme is intended to be a standard adopted by many manufacturers and content providers, the devices are manufactured according to a common specification. Unfortunately, the specification is also likely to be accessed by the public and used to circumvent the DRM scheme or otherwise render it ineffective. At the same time, content providers may desire to disseminate content and manufacturers build devices that are intended for use only under particular limitations (for example, within certain geopolitical boundaries or time periods).

What is needed is a system and method for protecting content from unauthorized use and/or dissemination that can augment current methods by providing additional causes of action against potential and actual infringers. What is also needed is a system and method that permits content providers and manufacturers to protect such content in ways that permit different schemes to be employed as required by geopolitical boundaries, time periods, content sensitivity or type, or by any other desired means. The system and method described herein satisfies these needs.

SUMMARY OF THE INVENTION

To address the requirements described above, the present invention discloses a method and system for securely and traceably enabling playing back of content on a playback device of a plurality of playback devices, each of the plurality of playback devices comprising a cryptographic function module (CFM).

In one embodiment, the method comprises accepting a first input in the playback device from a content licensing agency; generating, in the device, a first output from the first input according to a proprietary cryptographic function using the CFM, the first output necessary to enable playback of the content by the playback device, the proprietary cryptographic function being one of a family of proprietary cryptographic functions executable by the CFM of each of the plurality of playback devices; and enabling the playback of the content by the device at least in part according to the first output.

In a related embodiment, the system includes a device that comprises a first processor, a memory communicatively coupled to the processor, and a CFM integral to the device, wherein the cryptographic function module is configured to generate the intermediate output from the intermediate input according to a proprietary cryptographic function of a family of cryptographic functions executable by the CFM. Further, the above-described memory stores instructions that include instructions for accepting a first input in the device, generating an intermediate input from the first input, accepting an intermediate output, generating a first output, and enabling the playback of the content by the device at least in part according to the first output.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Distribution System

Figure 1:
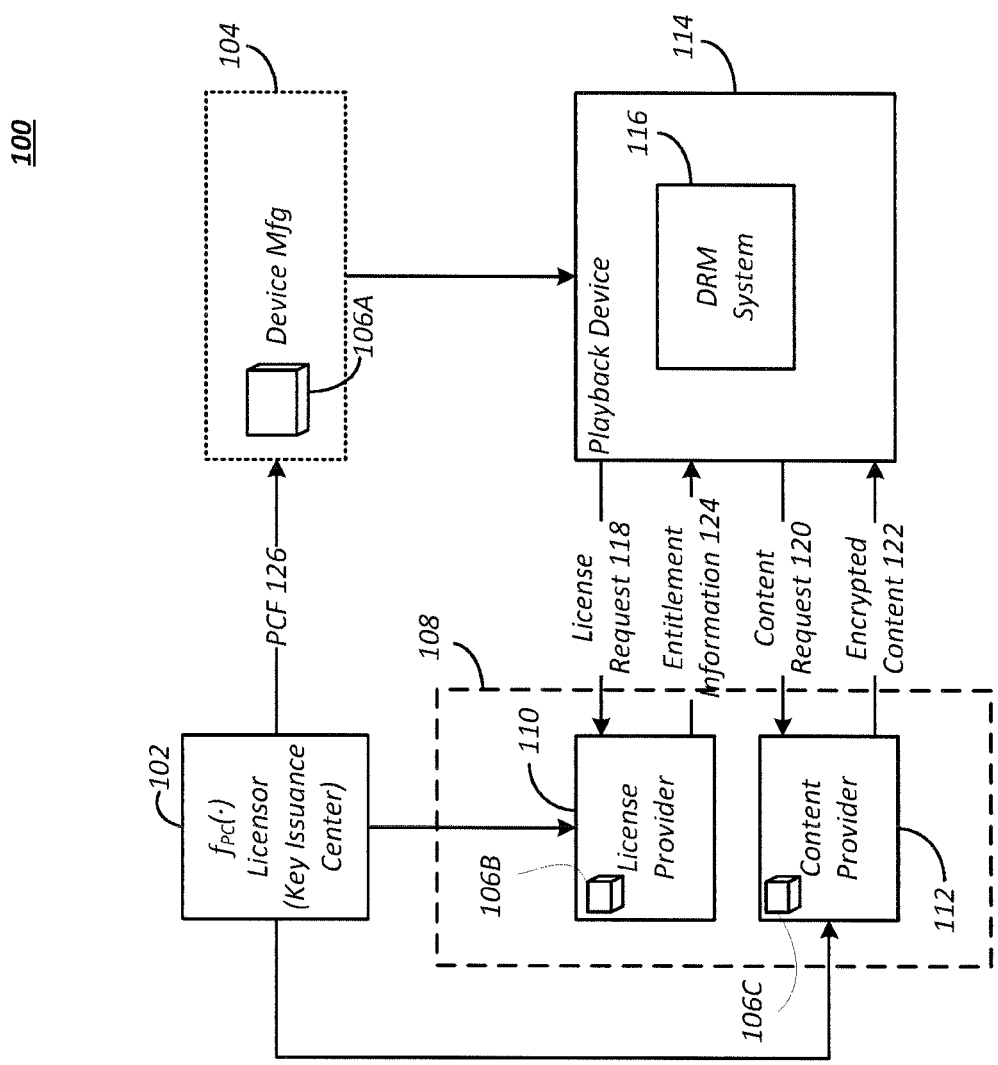
FIG. 1 is a diagram illustrating an overview of a distribution system that can be used to provide video data, software updates, and other data to subscribers.

FIG. 1 is a diagram illustrating an overview of a distribution system 100 that can be used to provide content data. Such content may include, for example, media programs such as television programs, movies, and/or video games.

The distribution system 100 comprises a function licensor 102, a content licensing agency or content licensor 108, and a playback device 114, which may be manufactured by a device manufacturer 104, also illustrated in FIG. 1. In one embodiment, the content licensor 108 comprises a license provider 110 (which may be implemented by a server or analogous device) and a content provider 112. The license provider 110 responds to requests 118 (for example, from the playback device 114) to obtain access to content by providing entitlement information for use by a digital rights management (DRM) system 116 of the playback device 114 to enable playback of the content.

The content provider 112 responds to a request 120 for content (e.g. from the playback device 114) by transmitting the content 122 to the playback device 114 for consumption. Typically, the content provided by the content provider 112 to the playback device is encrypted or otherwise obfuscated so as to only be used by playback devices 114 having a DRM system (DRMS) 116 that has been provided with the appropriate entitlement information 124 and is configured to accept and use the entitlement information 124 to provide the content 112.

PCFs

As discussed further below, the DRMS 116 implements one or more proprietary cryptographic functions 126 (PCFs) or that must be performed in order to permit the use of the content by the device 114. Because the PCF 126 is proprietary (e.g. cannot be executed without the permission of the licensor 102 without a license), the PCF 126 may also be regarded as a licenseable cryptographic function, or LCF. In one embodiment, the proprietary nature of the PCF is be rooted in the fact that it qualifies as protectable intellectual property (e.g. as trade secret, a copyrighted work, or a patented invention).

In one embodiment the PCFs 126 are input/output (I/O) indistinguishable cryptographic functions. In this context, an I/O indistinguishable function is a function having characteristics that cannot be ascertained solely from examination of the input values to the function and the output values that result from the function. For example, if the input/output pairs of a function were (1,2), (2,4), and (4, 16), it might reasonably be ascertained that the function is a square function, since the output in each case is a square of the input. In this case, this function is not I/O indistinguishable. If, however, the input/output pairs evidenced no pattern allowing the nature of the underlying function to be ascertained, the function may be categorized as I/O indistinguishable. A function may also be piecewise I/O distinguishable, yet continuously I/O indistinguishable. For example, if every Nth output of the square function discussed above deviated from the value that would result from a square function in a way that could not be ascertained by simply looking at the input/output pairs, that function may be I/O indistinguishable as well.

The PCFs 126 (indicated as $f_{PC}(\cdot)$ in FIG. 1) may be provided from the licensor 102 to the device manufacturer 104, the license provider 110 or the content provider 112 via an associated "black box" 106A-106C, respectively. The black box 106, as the name implies, is a device that performs a transformation of data such as code or keys, without revealing how the transformation is performed or disclosing the data. In this application, the use of the black box 106 allows the licensor 102 to remotely provide program instructions and/or data for installation into devices 114 at the facility of another entity without exposing that information and/or data itself to the entity. For example, the black box 106A may be provided to the manufacturer of the device 114 and used to program or configure a dedicated hardware or software processor module of the playback device 114 while holding the operations performed by the dedicated software or hardware module secret from the device manufacturer 104. The PCF's 126 may also be provided to the license provider 110 via black box 106B so that the license provider 110 may include the PCF 126 in the entitlement information 124 securely transmitted to the playback device 114. Similarly, the PCFs 126 may be provided to the content provider 112, allowing the content provider 112 to securely provide the PCF 126 with the encrypted content 122.

The cryptographic function is "licenseable" in the sense that the commercially viable performance of the function or combination of functions used to generate output values from input values requires a license from the licensor 102. That licensability may be derived from being proprietary to the licensor 102, for example by (1) being held secret from the public and being difficult to reverse engineer and/or (2) from being protectable as inventive and/or original intellectual property.

For example, a function may be "licensable" because reverse engineering (whether through examination of the input/output pairs, by stripping a processing chip performing the operation(s) or trying to access a secure memory having data required to perform the function) to determine the combination of operations required to implement the functions is commercially impractical, and the only commercially practical way to perform the function and compute proper output values from input values is by obtaining license to perform the function.

For example, consider the closed form function:

$$f_L(*) = u_o = FRC[\pi + u_i]^5 \qquad \text{Equation (1)}$$

This function $f_L(*)$ generates an output values $0 \leq u_o \leq 1$ from an input values $0 \leq u_i \leq 1$, which are substantially pseudorandom and highly uncorrelated in nature. Even if a large set of input/output pairs were considered, it would be difficult for an unauthorized entity to determine the nature of function $f_L(*)$ from the input/output values alone. Accordingly, in order to be certain of generating the proper output value $u_o$ from an input value, the DRMS 116 must have access to the underlying function, and the licensor 102 may limit the access to that underlying function to entities which have taken a license to implement that function in the hardware, software, or firmware of the playback device 114.

Importantly, the foregoing discussion's reference to the "commercially impracticability" of executing the function except through a license acknowledges the fact that given infinite resources and time, the nature of virtually any DRMS 116 or function performed by a DRMS 116 can be ascertained. However, such endeavors are "commercial impracticable" when the cost of such reverse engineering efforts exceeds the commercial benefit for a substantial majority of those who might engage in such activities. For example, if the licensable function 126 implemented in the playback devices 114 was easily updated or changed, the "commercially impracticability" of executing the function except through a license will be considerably less than if the licensable function cannot be changed, because the benefit of any such reverse engineering effort can be easily eliminated by simply updating the function 126 to another function 126. Similarly, if the licensable function 126 is implemented in a small number of playback devices 114, the commercially practicability of executing the function 126 except through a license will be less than for an licensable function unchangeably implemented in a large number of playback devices 114, because the economic benefit from a small number of playback devices is smaller than what might be obtained from a large number of playback devices 114.

A function 126 may also be licensable because it is sufficiently inventive or original to be protectable under a particular jurisdiction's intellectual property (e.g. patent or copyright) laws, and hence, performance of that function (at least, for the purpose of decrypting content) requires a license. Entities performing that function 126 without the appropriate license and using that function to decrypt and use the content will not only be liable for copyright infringement for unauthorized use of the content itself, but also patent or copyright infringement for the use or copying of the function 126 (e.g. copying the code for performing that function) as well. In such cases, the "licensable" status of the function lies not in its details being unknown and undecipherable, but its status as protected or protectable intellectual property.

Although illustrated separately, the license provider 110 and content provider 112 may operate together as single entity. For example, requests for entitlement information 124 and for content 122 may be transmitted to the same entity and received from the same entity.

As further described below, the PCF 126 may be provided from the licensor 102 to a manufacturer 104 of the playback devices 114, or may be provided from the licensor 102 to the license provider 110 or content provider 112 for eventual delivery and installation on the playback device 114. For example, the license provider 110 or content provider 112 may provide the function 126 to be downloaded and installed in the playback device 114 for execution as a part of the DRMS 116.

In one embodiment, the PCF 126 is one of a plurality of cryptographic licensable functions that may be executed by a plurality of playback devices 114. Device 114 groups having the same PCF 126 may be delineated by manufacturer, license provider, content provider, geopolitical location where the devices 114 are to be used or the content is to be consumed, or any combination thereof.

For example, all devices 114 manufactured by a particular device manufacturer 104 may employ the same PCF 126. Or, among devices 114 manufactured by a particular device manufacturer 104, only those devices 114 of the same model or similar designation may employ the same PCF 126. Or, devices 114 from a particular device manufacturer 104 may employ two or more PCFs 126, one of which is common to all devices 114 produced by the manufacturer 104, and other PCFs only common to devices 114 within a particular model group, or devices destined for a particular market. For example, all devices 114 manufactured by manufacturer 104 may include three PCFs 126, one PCF 126 that is common to all such devices 114, another PCF 126 that is common only to devices 114 of the same model, and another PCF 126 that is common only to devices 114 that are intended a subset of those device models for a particular market (e.g. to be sold for use in China, or models with extended capability).

Device groups may also be defined by content provider 112. For example, a particular content provider 112 such as FOX may desire that the presentation of all of the content provided by the content provider 112 requires performance of a particular PCF 126 that differs from that of other content providers 112.

Device groups may also be defined by the content 122 itself. For example, a content provider 112 may desire that presentation of each particular content 122 title or media program requires performance of a particular PCF 126 that differs from that of other content titles from the same or different content provider(s) 112 (e.g. the PCF 126 may be content unique across the content provider 112 or across all content providers 112). In which case, the content provider 112 may employ three PCIS 126, one for use with any content 122 from the content provider 112, and another PCF 126 that is unique to each content type (e.g. movies or television) and another that is unique to the content title. Further, in embodiments wherein the entitlement information 124 is provided by a license provider 110 separate from the content provider 112, device 114 groups may be defined by the license provider 110 or the content 122 associated with the license provider 110.

Device groups may also be defined by geopolitical boundaries as well. For example, playback devices 114 manufactured for intended use in one country or set of countries (or content 122 distributed for consumption in one country or set of countries) may include a particular PCF 126 that differs from those devices or content provided for use in other countries.

Figure 2A:
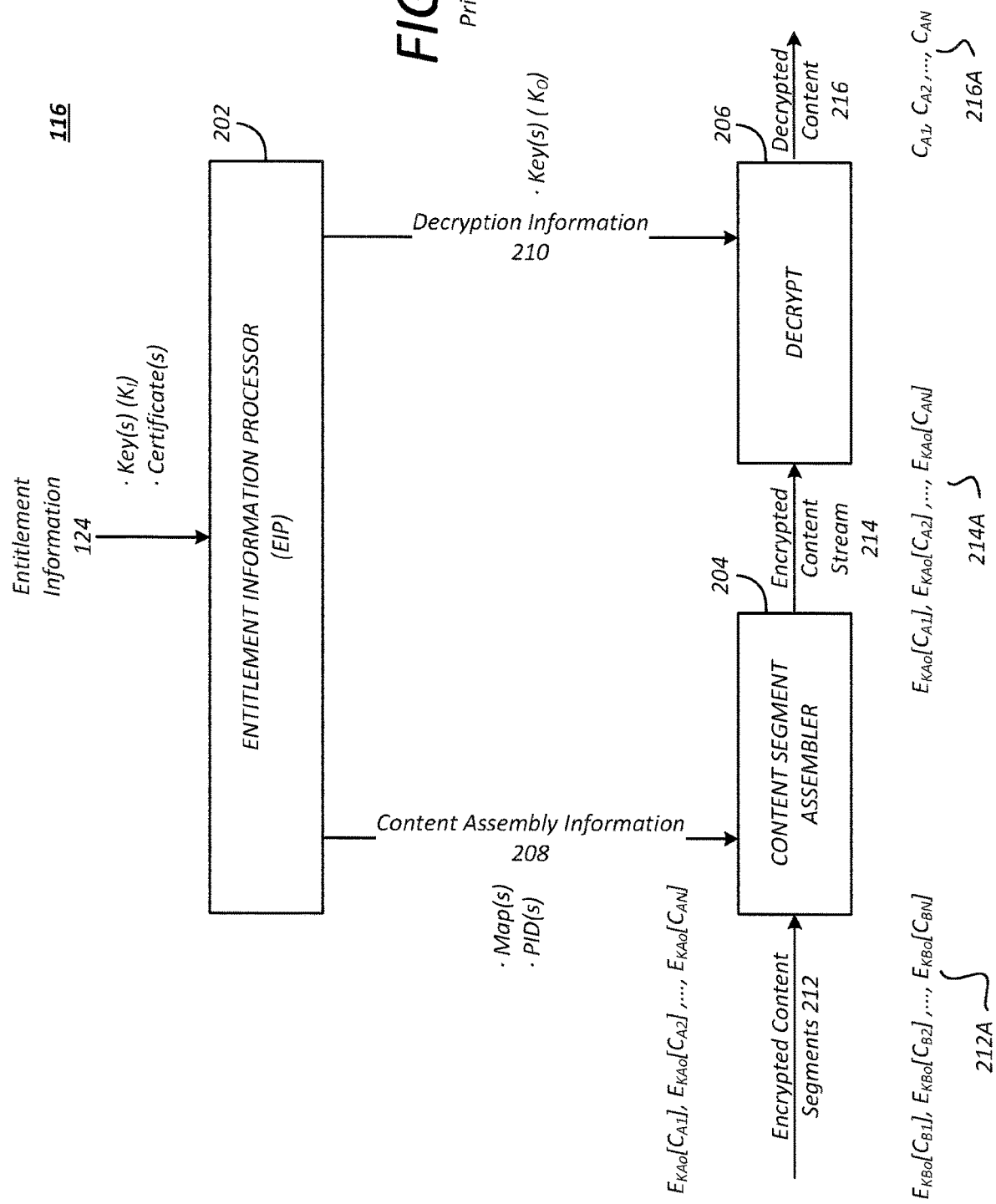
FIGS. 2A and 2B are diagrams illustrating the operations of a prior art digital rights management system.
Figure 2B:
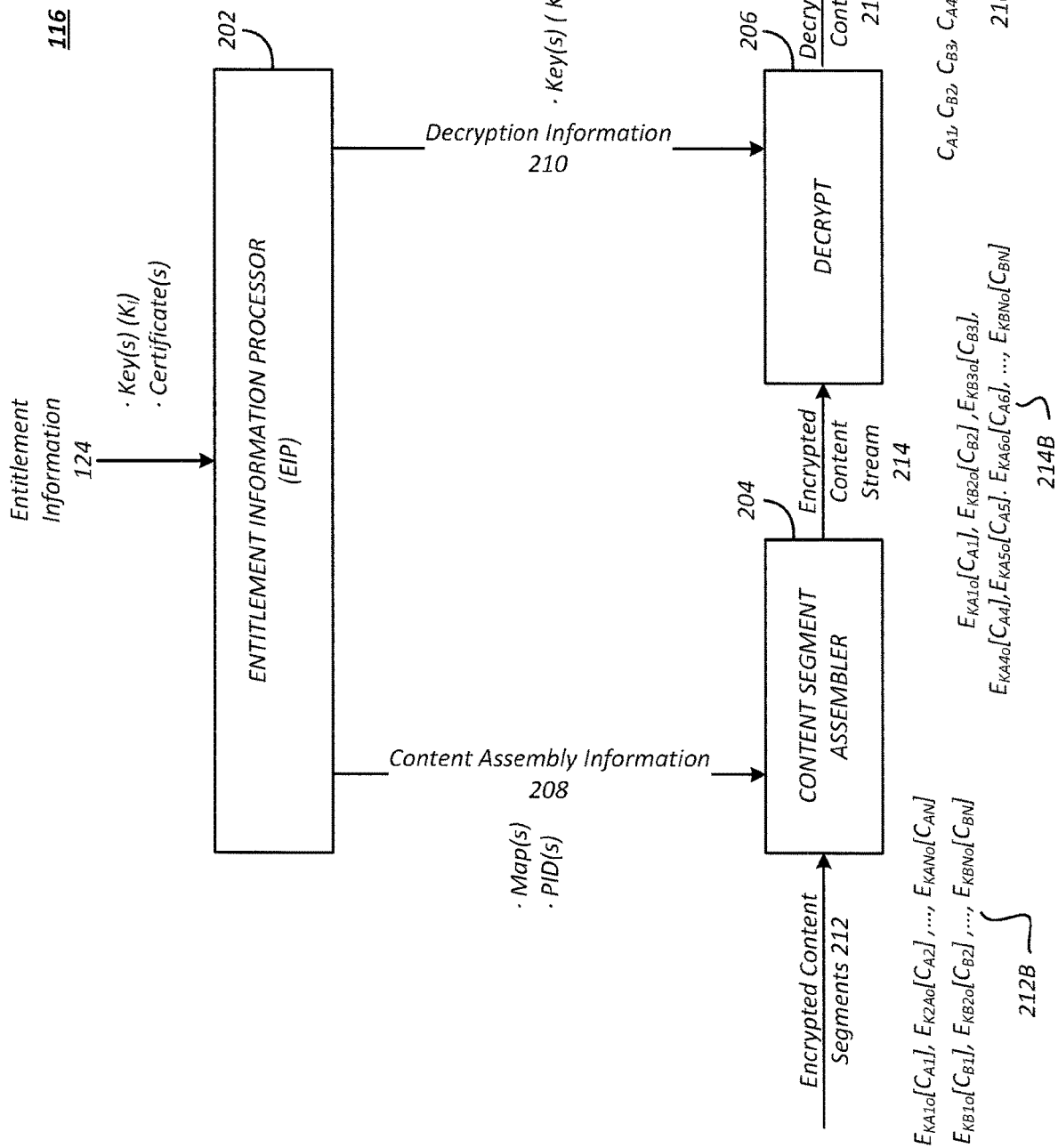

FIGS. 2A and 2B are diagrams illustrating the operations of a prior art DRMS 116. The DRMS 116 includes an entitlement information processor (EIP) 202, a content segment assembler (CSA) 204 and a decryptor 206.

In both FIGS. 2A and 2B, the EIP 202 accepts entitlement information 124, and from that entitlement information 124, generates content segment assembly information 208 required to assemble the encrypted content segments into an encrypted version of the content and decryption information required 210 to decrypt the assembled encrypted content segments 212. The CSA 204 accepts content segments 212 and assembles to those segments 212 together into an encrypted content stream 214 that is provided to the decryptor 206. The EIP 202 also generates the decryption information 210 (for example, decryption keys) needed to decrypt the segments of the encrypted content stream 214 from the entitlement information 124 and provides that decryption information 210 to the decryptor 206, which decrypts the segments of the encrypted content stream 214 using the provided decryption information 210.

First Embodiment—Demultiplexing a Transport Stream Having Multiple Media Programs In a first illustrative embodiment, the encrypted content segments 212 may take the form of the packets of a transport stream transmitting a plurality of media programs. For example, FIG. 2A illustrates a transport stream transmitting encrypted content segments 212A for two media programs (A and B), with each content segment for media program A (for example $C_{A1}, C_{A2} \ldots C_{AN}$ for media program A and $C_{B1}, C_{B2} \ldots C_{BN}$ for media program B) has been encrypted with the same key (e.g. $K_{Ao}$ and $K_{Bo}$).

Each encrypted packet or content segment for a media program includes a program identifier (PID) (in the illustrated case, A or B) that is associated with one of the media programs. To receive and present any one of the media programs, the CSA 204 parses the transport stream to identify encrypted packets (representing segments) having the PID associated with the desired program, and provides those packets to the decryptor 206 for decryption. For example, if media program A is selected, the CSA 204 parses the incoming segments to find those having the PID including "A," and provides those content segments 212A to the decryptor 206 for decryption. The encrypted packets or segments for media program A may be encrypted by a single key KAo, (resulting in encrypted segments 214A $E_{KAo}[C_{A1}]$, $E_{KAo}[C_{A2}], \ldots, E_{KAo}[C_{AN}]$), or each encrypted packet or segment may be encrypted according to a different key. For example, content segment $C_{AN}$ may be encrypted by key $K_{ANo}$, and content segment $C_{BN}$ may be encrypted by key $K_{BNo}$. In this case, the decryption of each content segment requires that the appropriate key be provided to the decryptor 206 (resulting in decrypted segments 216A $C_{A1}$, $C_{A2}, \ldots, C_{AN}$), which may be accomplished via the EIP 202 as described further below.

Second Embodiment—Media Program Assembled from Different Versions of Temporal Segments FIG. 2B is a diagram illustrating another embodiment in which the encrypted content segments 212B take the form of an assembly of media content segments that each comprise one of a plurality of versions of a temporal portion of a media program, possibly with each content segment encrypted with a different segment key. For example, a media program may be temporally separated into segments $C_1, C_2 \ldots C_N$ and two different (A and B) versions of those segments may be created (for example, using different encoding parameters, resulting in $C_{A1}, C_{A2} \ldots C_{AN}$ for version A of the media program and $C_{B1}, C_{B2} \ldots C_{BN}$ for version B of the media program) with each segment encrypted according to a different key (resulting in encrypted segments 214B $K_{A1o}, K_{A2o} \ldots K_{ANo}$ and $K_{B1o}, K_{B2o} \ldots K_{BNo}$, respectively). The media program to be played back can be assembled by selecting each temporal portion of the media program from versions A and B. Typically, this is accomplished via a map that is generated by the EIP 202 and provided to the CSA 204.

For example, the first temporal portion of the media program can be selected from version A, the second temporal portion of the media program can be selected from version B, the third temporal version of the media program from version B, and the fourth through the sixth temporal portion of the media program selected from version A (thus resulting in a series of decrypted content segments 216B $C_{A1}, C_{B2}, C_{B3}, C_{A4}, C_{A5}, C_{A6} \ldots C_{BN}$). The pattern of assembly of the content segments can be used to watermark the decrypted content for forensic purposes. Further, since a map is needed to identify which encrypted content segment versions are to be assembled together and each such segment is encrypted according to a different key (resulting in encrypted segments 214B, in the above example, $K_{A1o}$, $K_{B2o}, K_{B3o}, K_{A4o}, K_{A5o}, K_{A6o} \ldots K_{BNo}$), if the generation of either the map or the keys is compromised, the proper keys will not be provided for the encrypted content segments provided to the decryptor 206 and the media program will not be properly decrypted.

Figure 3A:
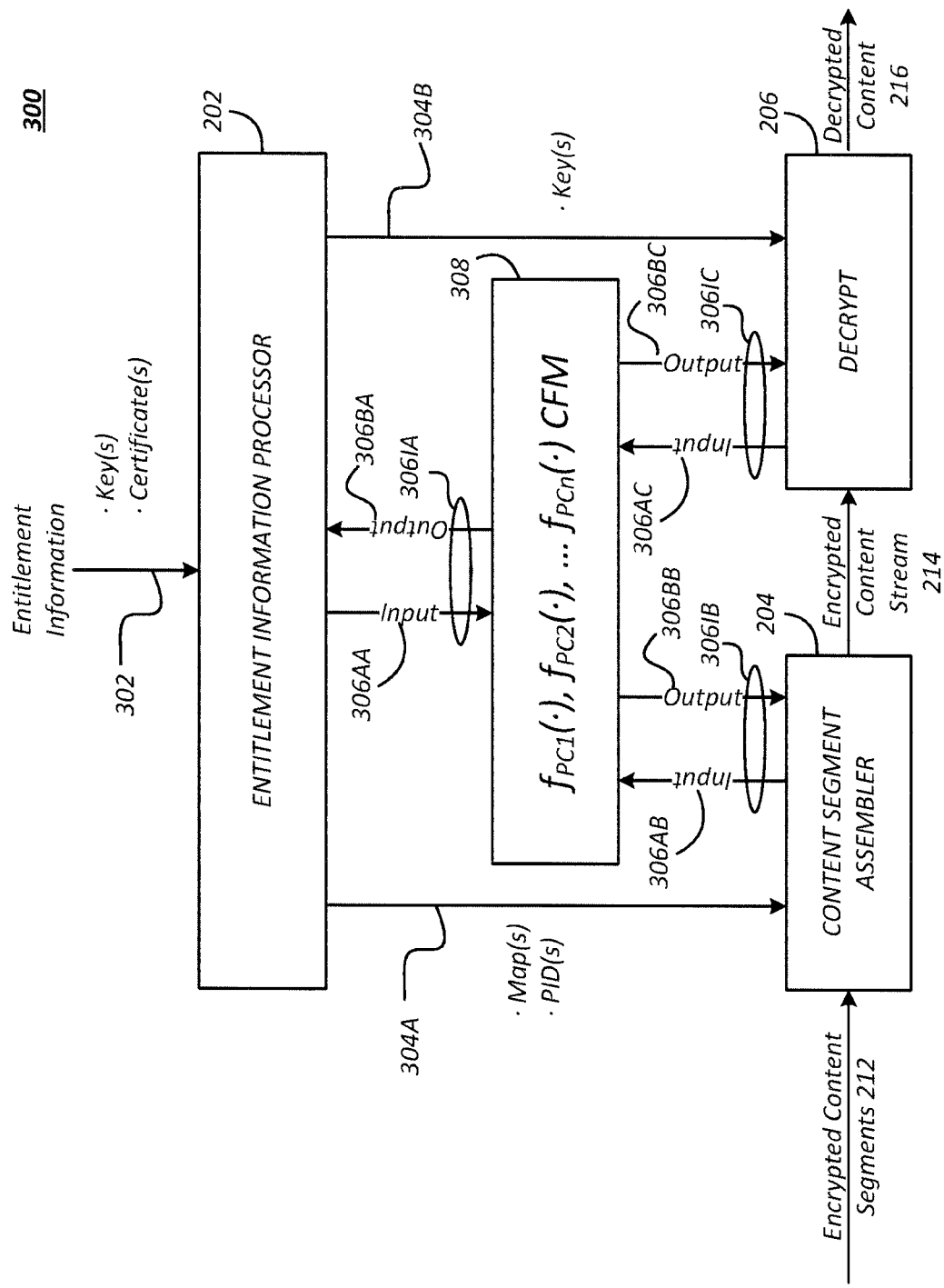
FIGS. 3A and 3B are diagrams illustrating one embodiment of an improved digital rights management system.
Figure 3B:
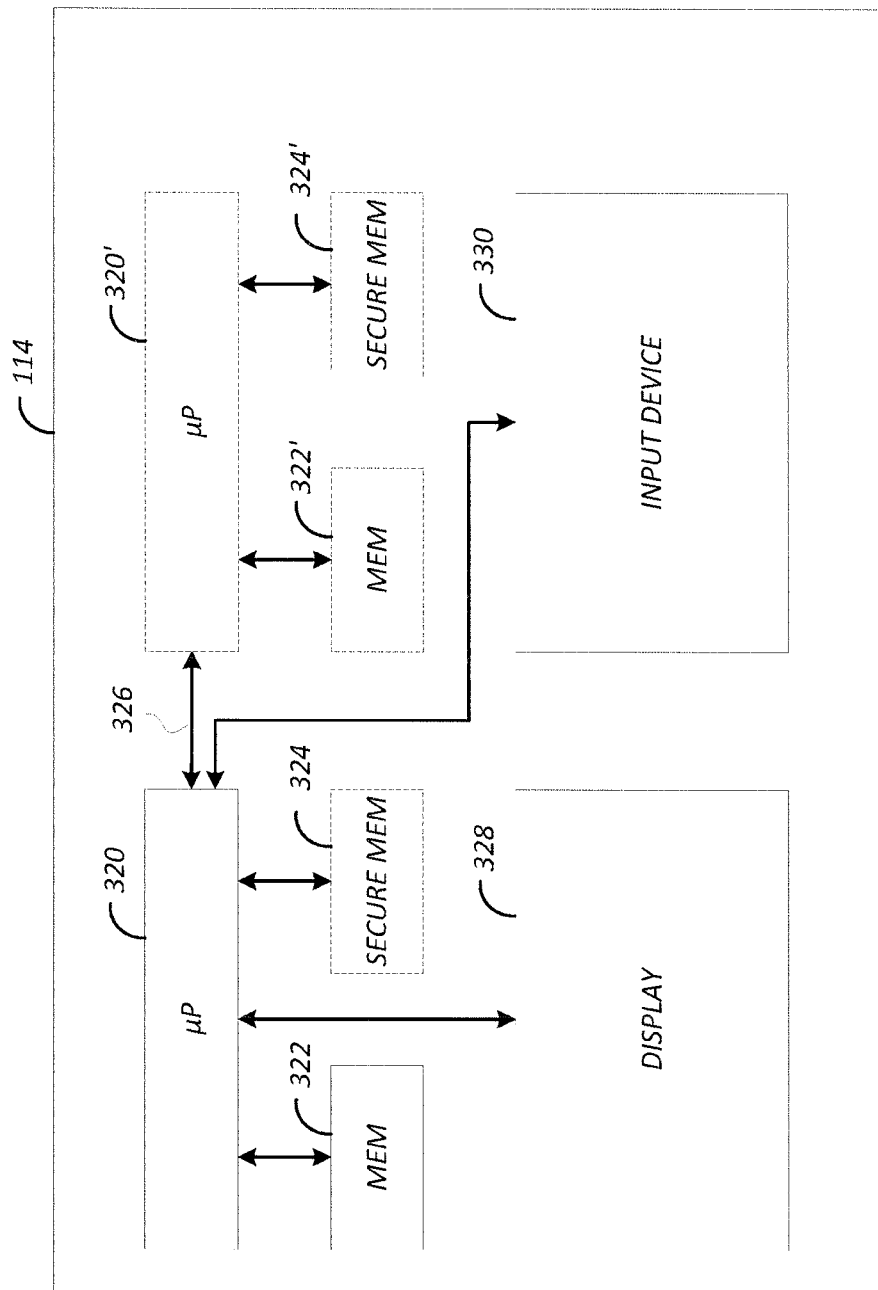

FIGS. 3A and 3B are diagrams illustrating one embodiment of an improved DRMS 300.

FIG. 3A presents a functional block diagram of the improved DRMS 300. The improved DRMS 300 utilizes a cryptographic function module (CFM) 308 to implement one or more PCFs 126 that may interposed among the operations performed by any combination of the EIP 202, the CSA 204 and/or the decryptor 206 as a part of providing content for playback as further described below.

FIG. 3B is a diagram illustrating an exemplary hardware structure for a playback device 114 implementing the DRMS 300. The playback device 114 comprises a processor 320 communicatively coupled to a memory 322 storing processor 320 instructions and data for performing the operations required to play back the content. Such operations may include, for example, any one or all of those associated with the CFM 308, the EIP 202, the CSA 204 and the decryptor 206. Some or all of the processor instructions and data may be stored in a secure memory 324 communicatively coupled to the processor 320. The secure memory 324 is secure in that access to the secure memory 324 to retrieve and/or store data is limited to trusted entities. This memory 324 may be rendered secure by enforcing a protocol that requires authentication between the memory 324 and an entity attempting to write to and/or read from the memory, via encrypting data to and from the secure memory with a symmetrical or asymmetrical key, or by other means. In one embodiment, the CFM 308 is implemented by a software module stored in the memory 322 or secure memory 324 and executed by processor 320.

The processor 320 is also communicatively coupled to an output device such as display 328 for presenting the decrypted and decoded content, and an input device 330 for accepting user inputs (e.g. to control the playback device 114). In one embodiment, the display 328 and input device 330 are integrated into a single unit such that the user views the content and provides input using a touchscreen or similar device.

In an alternate embodiment, some of said operations required to playback the content may be performed by one or more special purpose processors 320' executing instructions stored in memory 322 or in a memory 322' dedicated to the special purpose processor 320'. For example, any combination of the CFM 308, EIP 202, CSA 204, or decryptor 206 may be implemented in special purpose processors 320' executing instructions stored in memory 322 or 322'.

In one particular embodiment, the CFM 308 is implemented by a special purpose processor 320' having a communicatively coupled special purpose processor memory 322' and or special purpose processor secure memory 324'. In this case, the intermediate inputs 306AA-306AC and outputs 306BA-306BC are communicated between processors via communications link 326. In one embodiment, the CFM 308 is integral to the playback device 114 (e.g. cannot be removed by the end-user separately from other processing components).

Figure 4:
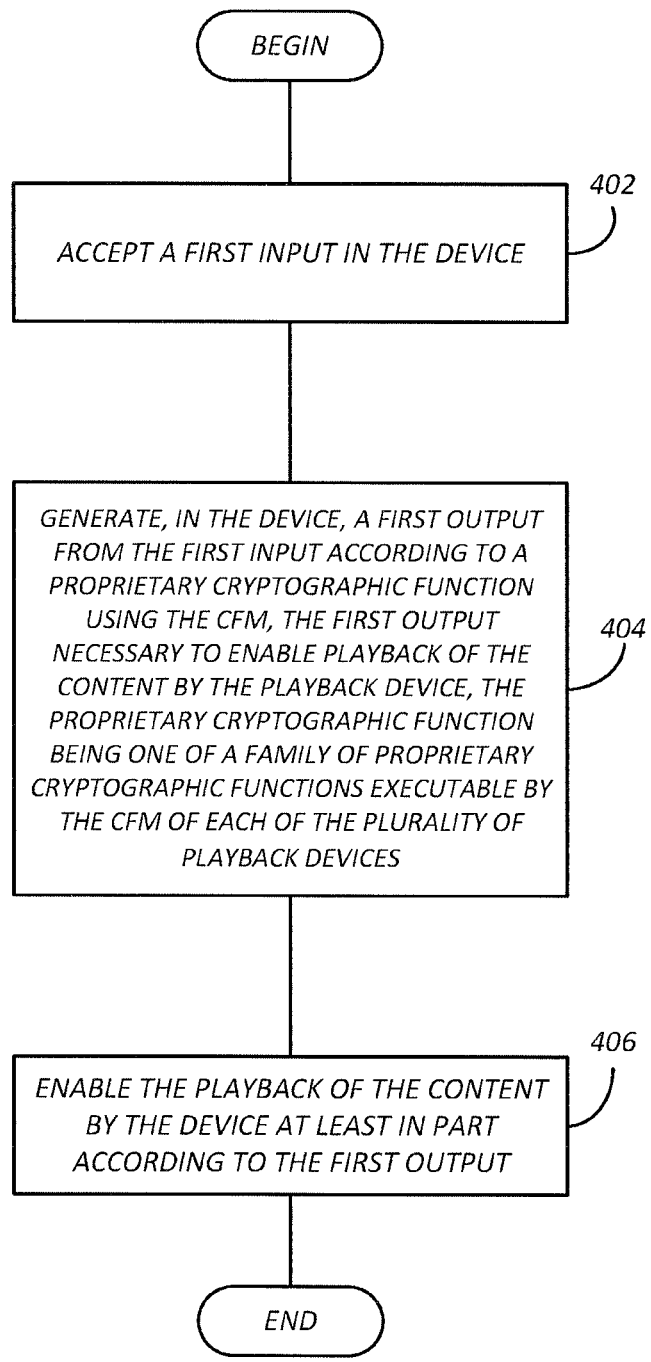
FIG. 4 is a diagram presenting exemplary operations that can be used in the employment of the cryptographic function module in providing content.

FIG. 4 is a diagram presenting exemplary operations that can be used in the employment of the CFM 308 in providing content. In block 402, a first input 302 having entitlement information is accepted into a device 114. As described herein, the first input 302 may comprises entitlement information 124 such as keys, digital certificates, authentication information, or seeds.

In block 404, a first output 304A and/or 304B (hereinafter alternatively referred to as first output 304) is generated from the first input 302, with the first output 304 being necessary to enable playback of the content by the playback device 114. As described herein, the first output 304 may include content assembly information 304A such as content segment maps, or packet identifiers, or (2) information enabling decryption of the content 304B such as keys or other information. The first output 304 is generated according to a proprietary cryptographic function or PCF 126 using the CFM 308.

In block 406, the playback of the content by the device 114 is enabled at least according to the first output 304. The first input 302 described above may be represented by the entitlement information provided to the EIP 202 and the first output is represented by (1) the content assembly information 208 such as the maps or other information provided to the CSA 204 to assemble content segments and/or (2) the decryption information 210 such as the keys or other information provided to the decryptor 206 to enable decryption of the media stream, wherein the generation of the first output 304 is accomplished at least in part by execution of the PCF using the CFM 308.

The PCF 126 executed by the CFM 308 can be one of a family of PCFs 126 available to the licensor 102 for provision to be installed on playback devices 114. As described herein, the one or more PCF(s) 126 installed on the playback device 114 and used to play back the content may be uniquely identifiable among the plurality of PCFs 126 by the output provided by the PCF 126 for a given input (e.g. identifiable by the input/output pairs of the executed PCF 126).

Figure 5:
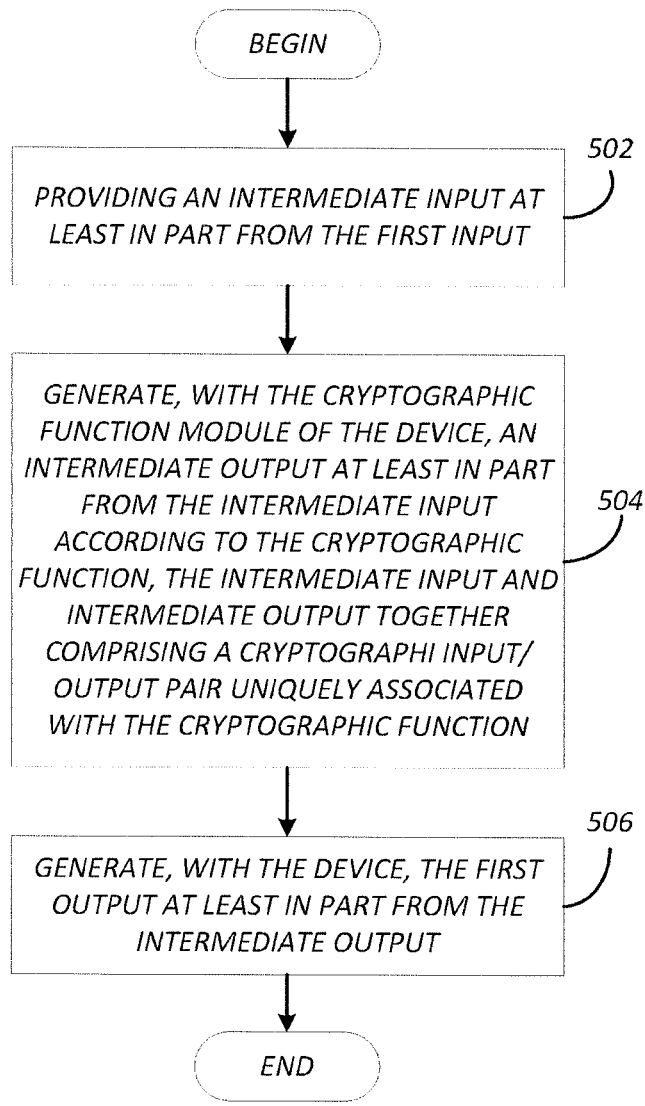
FIG. 5 is a diagram presenting exemplary operations that can be used in generating a first output from a first input.

FIG. 5 is a diagram presenting exemplary operations that can be used in generating the first output 304 from the first input 302. In block 502, one or more of intermediate inputs 306AA, 306AB and/or 306AC (hereinafter alternatively referred to as intermediate input 306A (generated at least in part from the first input 302) is provided to the CFM 308. In block 504, one or more of intermediate outputs 306BA, 306BB and 306BC (hereinafter alternatively referred to as intermediate outputs 306B is generated at least in part from the associated intermediate input 306A according to the PCF 126, using the CFM 308. The resulting intermediate input 306A/intermediate output 306B together comprise a cryptographic input/output pair 306IA, 306IB and 306IC (hereinafter alternatively referred to as I/O pairs 306I) which are uniquely associated with the PCF 126 used to generate them. This unique association allows the input/output pair 306I to be used to determine if the function performed by the CFM 308 is the desired or expected function. Finally, in block 506, a first output 304 is generated at least in part from the intermediate output 306B.

Figure 6A:
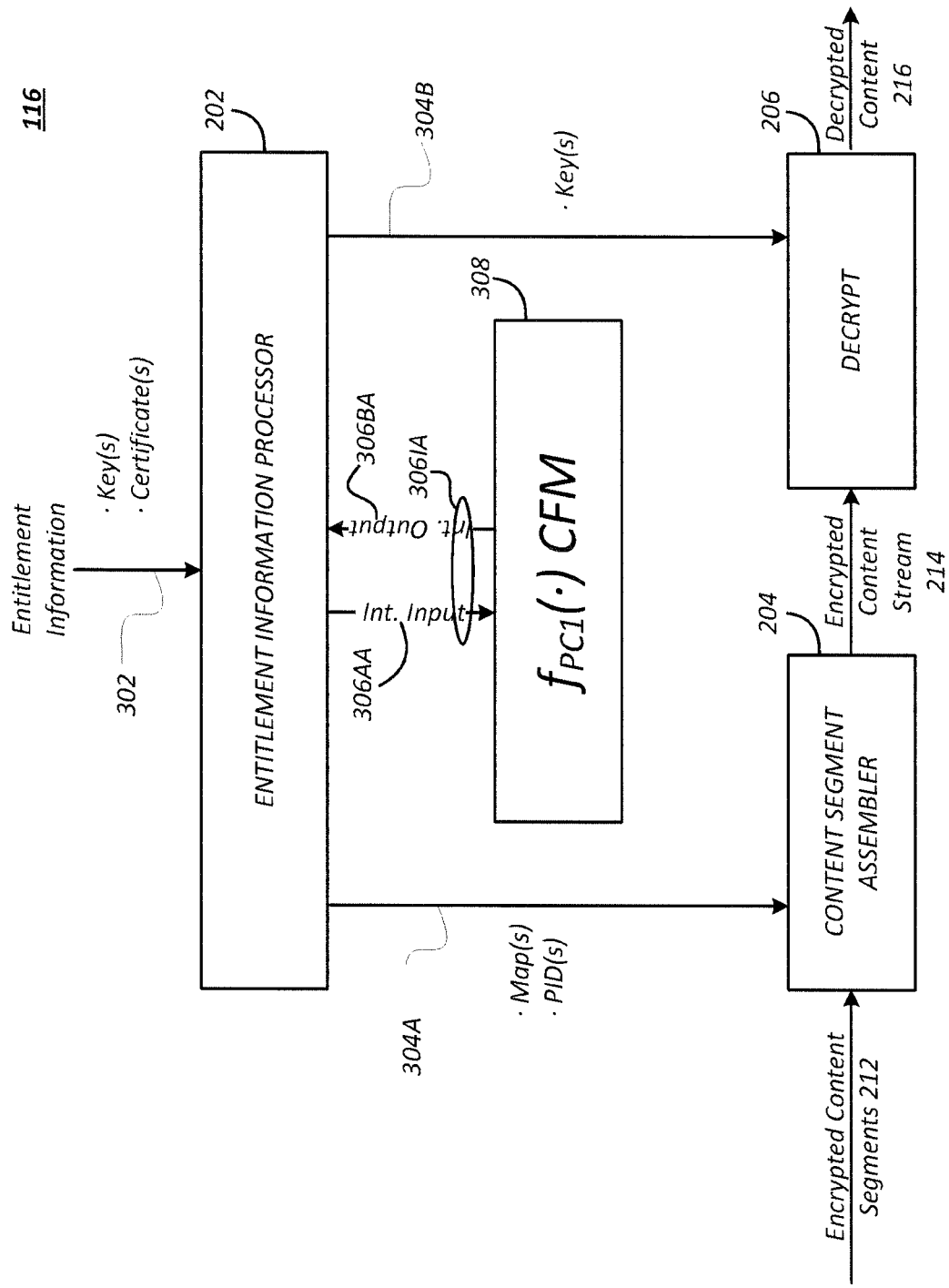
FIGS. 6A-6C are diagrams illustrating different embodiments of the proprietary cryptographic function digital rights management system.
Figure 6B:
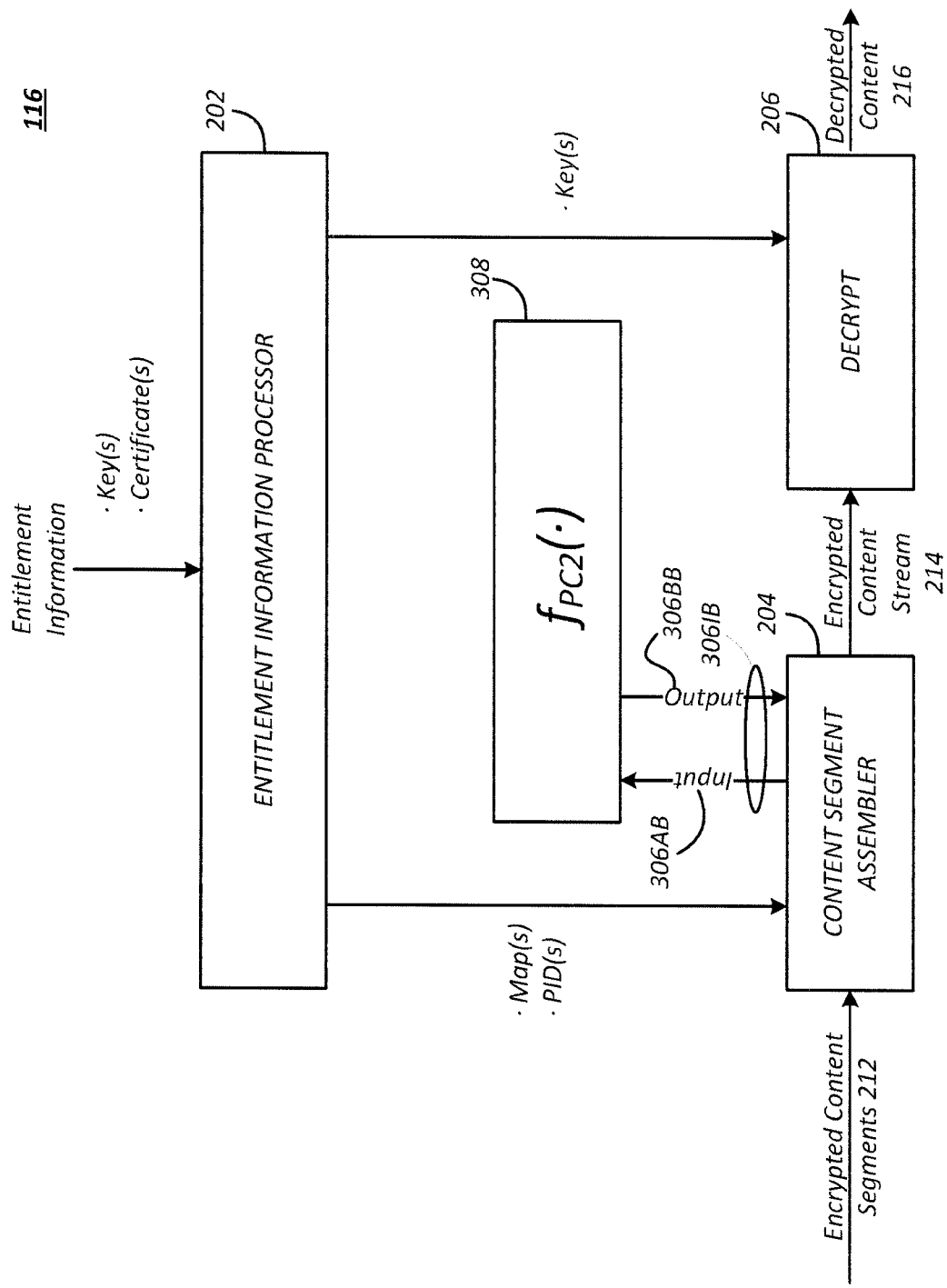
Figure 6C:
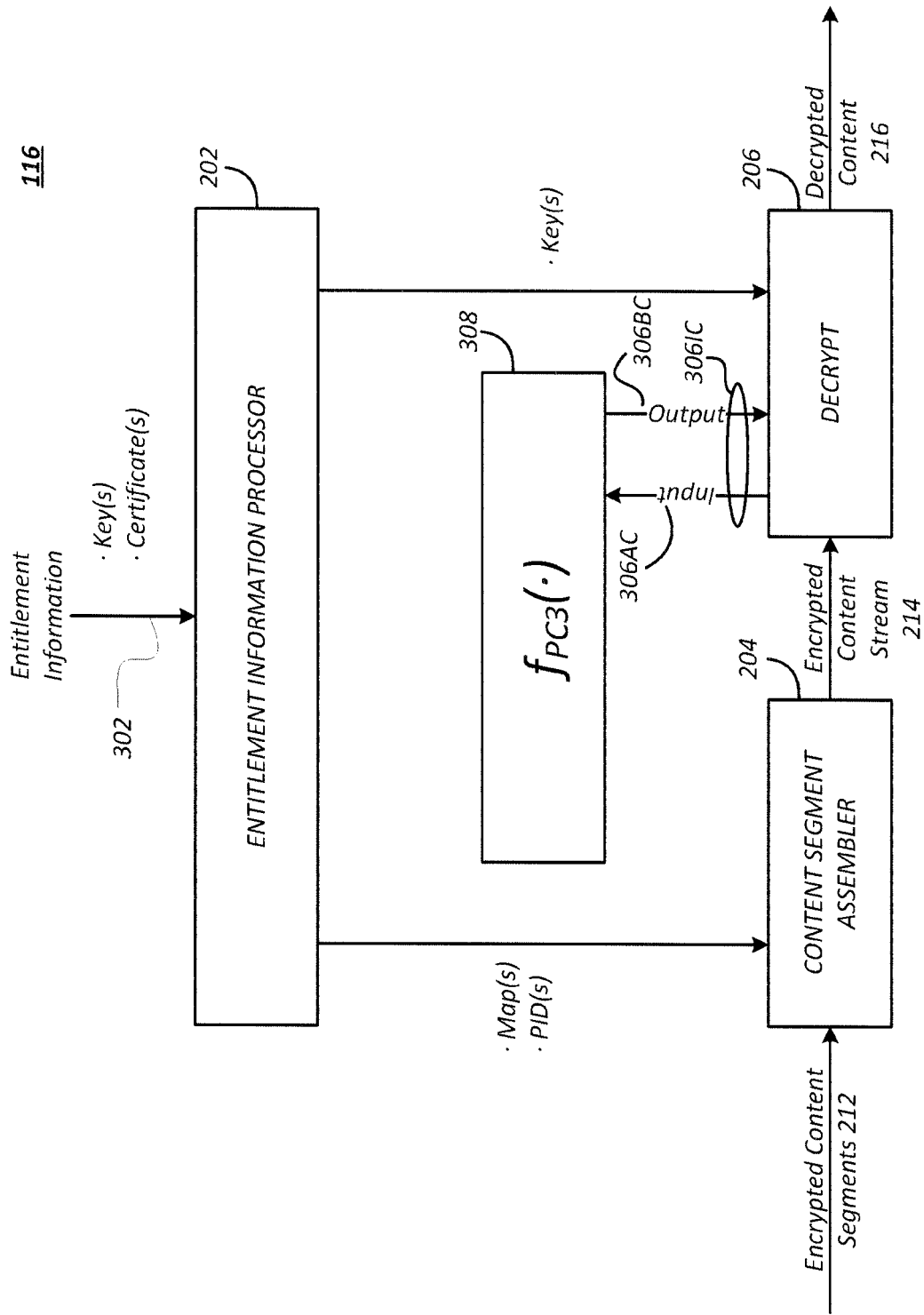

FIGS. 6A-6C are diagrams illustrating different embodiments of how the PCF 126 may be used by the DRMS 116. The CFM 308 may be used to generate intermediate output(s) 306B from intermediate input(s) 306A for use in either assembling the encrypted content segments, in decrypting the encrypted content segments, or both, as further described below.

Processing Entitlement Information with the PCF

FIG. 6A is a diagram illustrating an application of the use of a PCF 126 in the generation of the first outputs 304 by the EIP 202 (and provided to the CSA 204 and/or the decryptor 206). In this embodiment, the first input 302 comprises entitlement information 124 that is provided to the EIP 202. The entitlement information 124 may comprise keys, digital certificates, hash values, or any data or combination of data required to enable use of the content.

The EIP 202 accepts the entitlement information 302 and generates an intermediate input 306AA therefrom, which is provided to the CFM 308. The CFM 308 computes an intermediate output 306BA based at least in part on the provided intermediate input 306AA using the PCF 126, and provides the intermediate output 306BA to the EIP 202. The EIP 202 then computes the output 304A and/or 304B (hereinafter alternatively referred to as output 304) and provides the output 304 to the CSA 204 and/or the decryptor 206 as appropriate.

In one embodiment, the PCF 126 is installed on the playback device 114 by the manufacturer 104 of the playback device. The playback device manufacturer 104 may also install a plurality of PCFs 126 in a single playback device, with a different PCF 126 or set of PCFs 126 allocated to a each license provider 110 or content provider 112, or allocated for use in different jurisdictions. The PCFs 126 may be invoked by use of a code provided to the content licensor 108 and later provided to the playback device 114 along with the entitlement information. Some or all of the PCFs 126 may also be enabled via the blowing of a JTAG fuse or other artifice.

In other embodiments, the PCF 126 may be provided by the content licensor (e.g. the license provider 110 or the content provider 112) for installation in the memory 322, 322', 324, 324'. For example, entitlement information 302 in the form of a license file can be provided by the content licensor 108 or other entity. That license file may also include instructions for storage in a memory 322, 322', 324, 324' for execution by the processor 320, 320' of the playback device. These instructions may include one or more instructions for performing the PCF 126, and/or the instructions may include an instruction that invokes one or more PCFs 126 that was previously installed on the playback device.

In one embodiment, the PCF 126 may be used to generate output for assembling transport stream segments. For example, if the encrypted media segments comprise transport stream having multiple media programs, each delineated by a PID, the first input 302 or entitlement information 124 provided to the PIP 202 may comprise an input $u_i$, which can be used to generate the PID for the desired media program, at least in part using the PCF 126. Consider the PCF 126 of Equation (2) below, wherein the input $u_i$ is a number between zero and one.

$$f_{PC}(*) = u_o = \text{INT}[100 \times \text{FRC}[\pi + u_i]^5] \qquad \text{Equation (2)}$$

If the PID required to recover the media program segments from the transport steam is 64, an input $u_i$ of 0.20 to the PCF 126 will provide the desired result (64). Hence, the first input 302 or entitlement information may comprise an input value of 0.20. The CFM 308 computes the output value of 64 for the PID, and provides that value to the CSA 204 for use in assembling the content segments or packets. In this case, intermediate input value is 306AA the same as the input value 302 (e.g. 0.20) and the intermediate output value 306BA (e.g. 64) is the same as the output value 304A provided to the CSA 204.

Pre-processing to generate the intermediate input 306AA from the input value 302 and post-processing to generate the output value 304A from the intermediate output value 306BA (in either case, executed by the EIP 202) may also be performed. For example, the input value 302 provided to the EIP 202 as a part of the entitlement information may be a number upon which a plurality of functional operations are performed by the EIP 202 to generate the intermediate input 306BA, and the output 304A may be generated by performing additional operations on the intermediate output 306BA from the CFM 308.

In a second example, the CFM 308 may also be used to generate the maps that are used to assemble the content segment versions together to form the content title as described above. Again, this may involve preprocessing performed by the EIP 202 to generate the intermediate input 306AA from the input 302 provided in the entitlement information and/or post processing performed by the EIP 202 to generate the output value(s) 304A (map) from the intermediate output 306BA.

In a third example, the PCF 126 may be used to generate keys for decrypting assembled content segments in the encrypted content stream 214. Using the PCF 126, the CFM 308 may generate the keys necessary to decrypt the encrypted media program. For example, the entitlement information of the first input 302 provided to the EIP 202 may include input key ($K_1$) values, from which first output 304B in the form of one or more output keys ($K_o$) values needed by the decryptor 206 to decrypt the content are derived. For example, suppose that the input value 302 comprises an input key ($K_1$) provided in the entitlement information 124. That input key may be hashed by the EIP 202 with a cryptographic value to generate the intermediate input value 306AA provided to the CFM 308 The CFM 308 may then compute another number using the PCF 126 (for example, as defined in Equation (1)) and provide that number to the EIP 202 to perform one or more other cryptographic operations in order to generate an output value 304B having the output key ($K_o$) that is then provided to the decryptor 206 in order to decrypt the content (encrypted content stream 214).

In embodiments wherein each content segment is encrypted with a different key, multiple output keys may be generated and provided to the decryptor 206. This can be accomplished by use of multiple input keys or the use of one input key, from which multiple output keys can be generated. For example, the intermediate output $u_0$ of Equation (1) can be used as the input $u_i$ to generate each successive intermediate output, thus generating a series of pseudorandom numbers from an initial seed value of $u_i$. Other initial seed values for $u_i$ will generate different pseudorandom number sequences.

In the foregoing, if the incorrect PCF 126 is used to compute the intermediate output 306B from the intermediate input 306A, the result will be an incorrect intermediate output value 306B, which will not enable presentation of the decrypted media program. For example, if the incorrect PCF 126 is used to generate the incorrect PID, the CSA 204 will attempt to assemble the content segments 212 (packets) using the incorrect index. The result will be either an error (if there are no packets with the computed PID) or the assembly of segments for the incorrect media program. If the incorrect PCF 126 used to generate the playback map used to assemble content segments 212, the incorrect segments 212 will be selected for assembly, and those segments 212 will not be decryptable with the keys associated with those segments 212. Further, if the incorrect PCF 126 is used to generate the intermediate output 604B needed to generate the output key(s), the encrypted content will not be properly decrypted by the decryptor 206.

The PCF 126 may be used to take other actions as well. In particular, the intermediate I/O pairs 306I generated by the PCF 126 may be compared against expected results, and appropriate actions taken as further described below.

Figure 7:
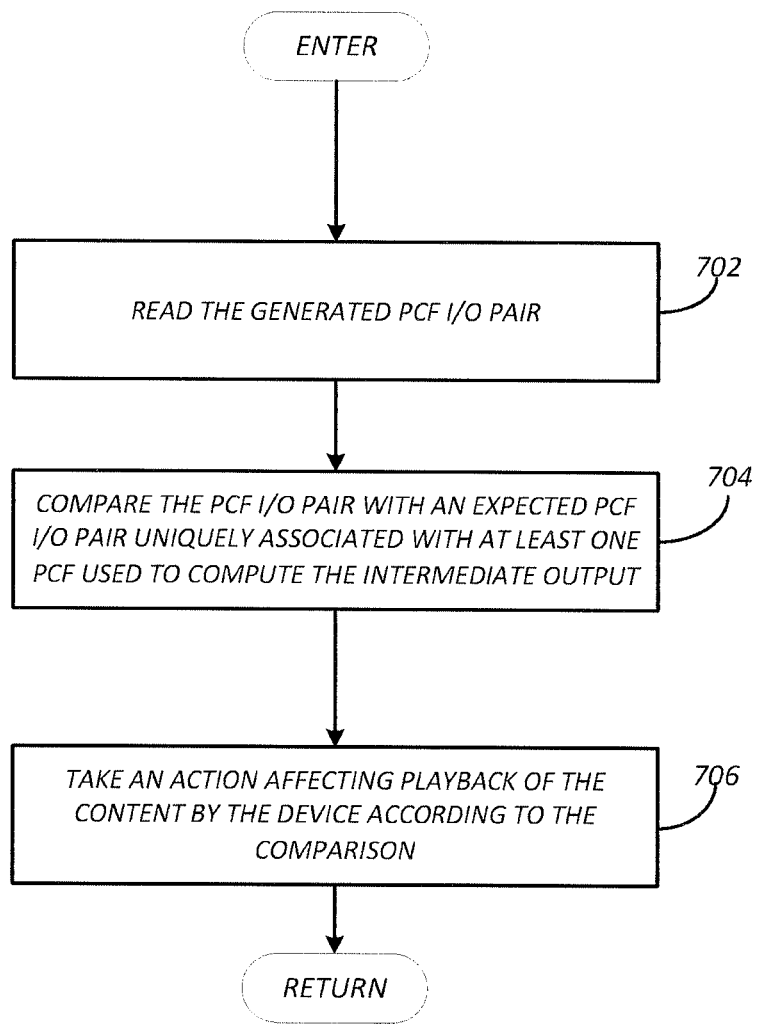
FIG. 7 is a diagram illustrating operations that may be performed to read and use the generated intermediate I/O pairs to enable or disable playback, or take other actions.

FIG. 7 is a diagram illustrating operations that may be performed to read and use the generated intermediate I/O pairs 306I to enable/disable playback, or take other actions. In block 702, the intermediate I/O pair 306I is read. In one embodiment, the intermediate I/O pair 306I is read directly from the CFM 308 or from a buffer or working memory used by the CFM 308 in implementing the PCF 126. In another embodiment, the intermediate I/O pair 306I is stored in a memory of the playback device 114 for later retrieval as described in block 702. In block 704, the read intermediate I/O pair 306I is compared to an expected intermediate I/O pair (e.g. an I/O pair expected to be generated by the PCF 126 implemented in the device 114). In block 706, an action affecting playback of the content by the device is taken according to the comparison determined in block 704.

In one example, as a part of generating the output 304 provided to either the CSA 204 or the decryptor 206, the EIP 202 may provide an intermediate input value 306AA to the CFM 308, and if the returned intermediate output value 306AB is not an expected value (which may be received by the EIP 202 from the content licensor 108 with the entitlement information 124 for purpose of comparison), the EIP 202 can initiate a number of actions, which might include (1) aborting the content segment assembly and/or decryption operations; (2) reporting that an incorrect value was computed or the value itself to a monitoring entity either internal or external (e.g. the licensor or to the playback device 114, which may thereafter disable the device 114 or perform some other action (3) presenting an interface on the device 114 informing the user that a fault has occurred and prompting the user to take remedial action, (4) incrementing a fault counter, or (5) any combination thereof.

The processors 320 and or 320' of the device 114 may also store intermediate I/O values 306IA (optionally, along with information identifying the device 114, device configuration, or the content that was being processed when the intermediate I/O values 306IA were being generated) in associated memories 322, 322', 324, or 324' for further analysis or action. These intermediate I/O values 306IA may be reported to or read by the license provider 110 or the content provider 112 via the communication link(s) used to obtain the entitlement information 124 or encrypted content 212. Preferably the intermediate I/O values 306I may be securely stored (e.g. in memory 324 or 324') so that they cannot be altered but may be read by or transmitted to entities investigating whether the device 114 performed the expected PCF 126. Intermediate I/O values 306I and related information may also be reported to other entities (for example, the licensor or key issuance center 102). This information can be used to identify compromised devices 114 and/or as a tool to stop further infringement by providing conclusive proof of a violation of applicable laws in the jurisdiction where the device 114 was sold or used.

For example, suppose a content provider 112 wishes to provide content for playback on playback devices 114. That content provider 114 may require that all devices 114 equipped to play back their content be configured to include a CFM 308 for performing a PCF 126 as a part of the DRM processing performed by the DRM system 116 of the device 114. The licensor or key issuance center 102 may generate an appropriate PCF 126 for incorporation into the device 114, and provide the device manufacturer 104 with a black box 106A for securely (e.g. without disclosing the operations performed) installing a CFM 308 that performs the PCF on the device 114. The devices 114 are then sold or distributed to customers, who then communicatively couple their devices 114 to a content licensor 108 to obtain the entitlement information 124 and encrypted content 122 for playback using the device 114.

The content provider 112 then segments the content 122 and encrypts the segments of the content (thereby producing encrypted content segments 212) such that the entitlement information 124 and use of the proper PCF 126 is required to reassemble and/or decrypt the encrypted content segments 212. In a simple example, the content provider 112 may encrypt each of the content segments 212A so that they can only be decrypted using an output key $K_o$ generated from an input key $K_1$ at least in part by performing the PCF in the CFM 308.

After communicative coupling of the device 114 to the content licensor 108 via the Internet or other communication means, the device 114 receives the entitlement information 124, and the EIP 202 uses the CFM 308 to perform the PCF 126 as a part of the DRM system implemented on the device 114. If the incorrect PCF 126 is performed by the device 114, the proper segments 212 will not be assembled and/or the assembled segments 214 will not be properly decrypted. In the example above, the device 114 receives the input key $K_1$, and using the PCF 126 installed by the manufacturer on the device 114, generates the required output key (e.g. decryption information 210).

If the device 114 has been compromised so that the segments 212 are assembled and the assembled segments 214 properly decrypted regardless of the fact that the incorrect PCF 126 has been performed (e.g. by bypassing or spoofing the PCF 126), the intermediate I/O pairs 306IA computed by the PCF 126 will not match expected values, and a comparison of the two will reveal that the device 114 has been compromised. This information can be used by the device 114 to suspend or modify playback of the decrypted content 216 (for example, by playing them back at reduced resolution), or can be reported to the function licensor 102 or the content licensor 108.

Further, any unlicensed entity that performs or induces performance of the PCF 126 (even if the resulting I/O pairs 306I are not used to complete the DRM process and generate the first output 304B necessary to present the content) will be executing the proprietary PCF 126, and will therefore be committing copyright infringement by reproducing or copying the content itself and/or patent infringement for performing the function or implementing it in the device as well. This provides the function licensor 102 and/or content licensor 108 with other avenues by which they may seek injunctive relief to stop further infringement, or damages.

FIG. 6B is a diagram illustrating an application of the use of a PCF 126 in the generation of the intermediate output information 306BB by the CSA 204. The operation of the CFM 308 in this case is analogous to that presented in FIG. 6A, except that the PCF 126 is executed in connection with content segment assembly operations performed by the CSA 204. For example, the EIP 202 may be provided with an encrypted version of the PID that is provided to the CSA 204 in assembling the content segments 212 into the encrypted content stream 214. That encrypted PID may be provided from the CSA 204 to the CFM 308, which returns a decrypted PID to the CSA 204 so that the content segments 212 may be properly assembled. Alternatively, the CFM 308 may return a number or value that requires further processing by the CSA 204 (for example, another hash operation) in order to generate the proper PID. The CSA 204 may then assemble the encrypted content segments to produce the encrypted content stream 214, which is provided to the decryptor 206 for decryption to produce the decrypted content 216

As was described above with respect to FIG. 6A, the intermediate results comprising I/O pairs 306IB can be used to confirm that the PCF 126 was correctly performed by the CSA 204, with the results used to suspend or modify the presentation of the decrypted content 216. The I/O pairs 306IB or the result of a comparison between the I/O pairs 306IB can be reported to the function licensor 102 or the content licensor 108 or other entity for further action, either when the data or comparison becomes available, or at another time. For example, the results may be reported while the encrypted content 122 is received and decrypted for presentation, or with the next license request 118 or content request 120.

FIG. 6C is a diagram illustrating an application of the use of a PCF 126 by the CFM 308 in the generation of the intermediate output information 306BC. The operation of the CFM 308 in this case is analogous to that presented in FIGS. 6A and 6B, except that the PCF 126 is executed in connection with decryption operations performed by the decryptor 206. For example, the EIP 202 may be provided with entitlement information 124 that comprises an encrypted version of one or more keys that are provided to the decryptor 206 to decrypt the assembled encrypted content segments 212 of the encrypted content stream 214 to produce the decrypted content 216. The encrypted key(s) may be provided from the decryptor 206 to the CFM 308, which executes operations including the PCF 126 to return decrypted key(s) to the decryptor 206 so that the encrypted content segments of the encrypted content stream 214 may be properly decrypted. Alternatively, the CFM 308 may return a number or value that requires further processing by the decryptor 206 (for example, another hash operation or combining operation with another key or secret) in order to generate the proper key(s). The decryptor 206 may then use such keys(s) to decrypt the encrypted content segments of the encrypted content stream 214 to produce the decrypted content, which is provided to the for presentation on a display of the playback device 114, or if so equipped, or a display or monitor communicatively coupled to the playback device 114.

As was described above with respect to FIGS. 6A and 6B, the intermediate results comprising I/O pairs 306IC can be used to confirm that the PCF 126 was correctly performed by the decryptor 206, with the results used to suspend or modify the presentation of the decrypted content 216. The I/O pairs 306IC or the result of a comparison between the I/O pairs 306IC can be reported to the function licensor 102 or the content licensor 108 or other entity for further action, either when the data or comparison becomes available, or at another time. For example, the results may be reported while the encrypted content 122 is received and decrypted for presentation, or with the next license request 118 or content request 120.

As described above, the PCF 126 may be one of a family of PCFs 126 that can be implemented by the CFM 308 of the DRM system 116. Further, the PCFs 126 may be defined such that the intermediate I/O pairs 306I resulting from application of the PCF 126 to an intermediate input 306A to generate an intermediate output 306B at least somewhat unique to the PCF 126. This permits the intermediate I/O pairs 306I to be used to take a number of different actions that might be desirable.

Playback of Licensed Premium Content by Licensed Compatible Playback Devices One problem associated with the dissemination and playback of media programs is that counterfeiters may place labels, logos, or other monikers on packaging indicating that the packaged media program or device complies with certain quality standards and are licensed devices and/or media, when in fact, the packaged media program or device does not provide the premium experience and/or provides the experience, but is not officially licensed to do so.

For example, it is envisioned that media program with high dynamic range playback may be provided to consumers. Such media programs may be capable of being played back with standard dynamic range using a standard playback device 114, but only those devices compliant with high dynamic range standards are capable of playing back such media programs with high dynamic range. Products complying with standards for such high dynamic range playback (media programs and playback devices 114) may be "certified" as such, with the certification being indicated using logos or other insignia, for example, on the device itself or it's packaging.

With regard to such premium content, counterfeit media programs of two types may be expected: (1) media programs which do not include premium content (e.g. high dynamic range video), but indicate such on packaging with a false logo or certification, and (2) media programs which include premium content, but for which the premium content is not licensed (e.g. the media program is from an unauthorized source that is not licensed to provide the media program at all or not in the premium format). Also, counterfeit devices of two types may be expected: (1) devices which are labeled as if they are capable of reproducing premium content (e.g. high dynamic range video), but are in fact incapable of doing so, and (2) devices which are labeled as if they are capable of reproducing premium content and are capable of doing so, but are from an unauthorized source that is not licensed to reproduce the media program in the premium format.

The foregoing techniques can also be used to control the presentation of information verifying that both the media program and the playback device 114 comply with premium content requirements and are licensed to do so.

For example, a PCF 126 may be provided only to playback devices 114 that are licensed, and hence, certified to provide the premium content. At the same time, only media programs certified to include premium content may include information that, when operated upon by the PCF 126 of the playback device 114, cause the playback device 114 to generate an output that can be used to provide a perceivable indication that both the media program and the playback device are genuine and certified to be from a licensed source.

As before, the PCF itself is proprietary and hence, may include licensable intellectual property. So if the PCF is protected intellectual property, any entity using the PCF 126 without authorization may be liable for infringement of that intellectual property. Further, any licensed entity that violates that license by providing the PCF to unlicensed entities may be liable for contributory or induced infringement of that intellectual property, as well as breach of contract. Further, the information included in the media program and used by the PCF 126 may be protected intellectual property (e.g. under copyright law)

The PCF 126 may be installed in the playback device 114 at the time of manufacture, or installed on the playback device 114 remotely as described above. The PCF 126 may also be remotely updated after distribution of the playback device 114 to the customer. The information used by the PCF 126 may be transmitted in a transport stream in a location reserved for auxiliary data, or may be placed in a frame or packet header as desired. At least in part using the PCF 126, the device retrieves the information from the media program, computes a value needed to present the content, and if the correct value is computed, presents the content.

In one embodiment, the "content" provided may be a splash screen indicating that the media program includes genuine premium content. This splash screen will only be provided if the correct information is provided to the PCF 126, which will only occur if a genuine media program is played back on a genuine playback device 114.

This feature can be used by customs authorities to identify bogus, gray market or uncertified media programs or playback devices. This can be accomplished by supplying the customs official with a genuine, certified playback device 114, and instructing the customs official to attempt to play media programs purporting to be genuine on the known, genuine, certified playback device 114. If the splash screen (or other indicia that the media program is certified or genuine) is not displayed (which will be the case, since the information provided along with the media program will be incorrect or missing) the customs official can conclude that the media program is not certified genuine, and is either bogus, gray market or uncertified goods. It is also possible to include PCFs 126 that look for certain characteristics of the media program, and based on those characteristics, present a different splash screen that identifies the media program as not genuine, and perhaps, the suspected source of the media program. The PCF 126 may also report the results of this evaluation to an entity such as the content licensor or the PCF 126 licensor to alert them of the presence of infringing goods.

Similarly, a known genuine media program can be used to confirm that a playback device 114 is genuine in the same manner. A known, genuine media program is provided to the playback device 114 for playback. Since if the playback device 114 is genuine it will include the appropriate PCF 126, and when the information included with the media program is processed at least in part by the PCF 126 of the playback device 114, the "content" (for example, the splash screen or logo) will be properly reproduced, indicating to the customs official that the playback device 114 is a genuine, certified product (e.g. licensed to play back the premium content). If however, the proper PCF 126 is not provided, the indicia of a splash screen or logo will be improperly reproduced, or not reproduced at all, thus indicating to the customs official that the playback device 114 is not a genuine, certified product. Furthermore, if the playback device 114 includes the proper PCF 126, but that PCF 126 is not licensed, the manufacturer and user of that playback device 114 may be liable for infringement of the intellectual property of the PCF 126, thus offering another means to obtain compensation and/or prevent further infringement.

Hardware Environment

Figure 8:
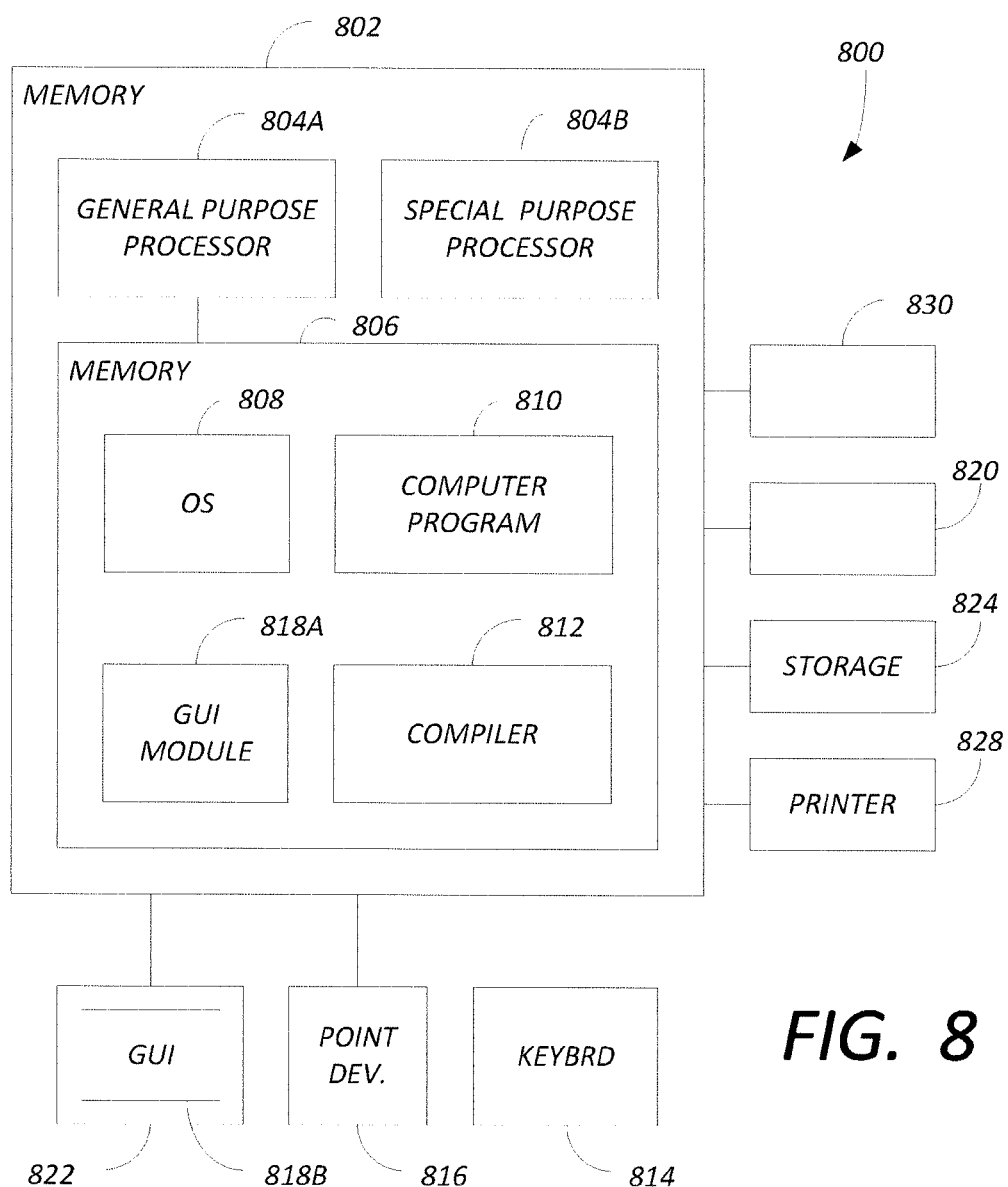
FIG. 8 is a diagram of a computer system that may be used to implement the playback device or elements thereof.

The playback device 114 or elements thereof may be implemented in a computer system 800 as shown in FIG. 8. The computer system 800 comprises a computer 802 which includes a general purpose hardware processor 804A and/or a special purpose hardware processor 804B (hereinafter alternatively collectively referred to as processor 804) and a memory 806, such as random access memory (RAM). The computer 802 may be coupled to other devices, including input/output (I/O) devices such as a keyboard 814, a mouse device 816 and a printer 828.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808 to provide output and results.

Output/results may be presented on the display 822 or provided to another device for presentation or further processing or action. In one embodiment, the display 822 comprises a liquid crystal display (LCD) having a plurality of separately addressable pixels formed by liquid crystals. Each pixel of the display 822 changes to an opaque or translucent state to form a part of the image on the display in response to the data or information generated by the processor 804 from the application of the instructions of the computer program 810 and/or operating system 808 to the input and commands. Other display 822 types also include picture elements that change state in order to create the image presented on the display 822. The image may be provided through a graphical user interface (GUI) module 818A, and displayed as GUI 818B on display 822. Although the GUI module 818A is depicted as a separate module, the instructions performing the GUI functions can be resident or distributed in the operating system 808, the computer program 810, or implemented with special purpose memory and processors.

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 802 may also implement a compiler 812 which allows an application program 810 written in a programming language such as COBOL, C++, FORTRAN, or other language to be translated into processor 804 readable code. After completion, the application or computer program 810 accesses and manipulates data accepted from I/O devices and stored in the memory 806 of the computer 802 using the relationships and logic that was generated using the compiler 812.

The computer 802 also optionally comprises an external communication device such as a modem, satellite link, Ethernet card, or other device for accepting input from and providing output to other computers.

In one embodiment, instructions implementing the operating system 808, the computer program 810, and/or the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, or a flash drive. Further, the operating system 808 and the computer program 810 are comprised of computer program instructions which, when accessed, read and executed by the computer 802, causes the computer 802 to perform the steps necessary to implement and/or use the present invention or to load the program of instructions into a memory, thus creating a special purpose data structure causing the computer to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 802.

Although the term "computer" is referred to herein, it is understood that the computer may include portable devices such as smartphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while examples of a proprietary licenseable function have been presented for exemplary purposes, the actual proprietary licenseable function may be substantially more complex than those illustrated.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of securely playing back an encrypted content on a playback device, the method comprising:

receiving, by the playback device, one or more keys;
executing, by the playback device, a cryptographic function using the one or more keys to generate a content key for decrypting the encrypted content; and
decrypting, by the playback device, the encrypted content using the content key;
wherein the cryptographic function is provided by a licensing entity subject to a license, and wherein the playback device executes the cryptographic function subject to the license to execute the cryptographic function, and wherein the cryptographic function is unique to the encrypted content.

2. The method of claim 1, wherein the cryptographic function is input/output (I/O) indistinguishable and is provided by the licensing entity for installation on the playback device without revealing the cryptographic function.

3. The method of claim 1, wherein the playback device is one of a class of playback devices and the cryptographic function is unique to the class of playback devices, wherein the class is defined according to a specific geographical location in which the playback device is used.

4. The method of claim 1, wherein the encrypted content is provided by a content provider, and the cryptographic function is unique to the content provider.

5. The method of claim 1, wherein the cryptographic function is provided to the playback device by a content provider with the encrypted content and a license file including the one or more keys.

6. A method of securely playing back an encrypted content on a playback device, the method comprising:
receiving, by the playback device, one or more keys;
executing, by the playback device, a cryptographic function using the one or more keys to generate a content key for decrypting the encrypted content; and
decrypting, by the playback device, the encrypted content using the content key;
wherein the cryptographic function is provided by a licensing entity subject to a license, wherein the playback device executes the cryptographic function subject to the license to execute the cryptographic function, and wherein the executing of the cryptographic function includes:
generating an intermediate input based on the one or more keys; and
generating an intermediate output based on the intermediate input;
wherein the intermediate input and intermediate output together comprise a cryptographic function input/output (I/O) pair uniquely associated with the cryptographic function, and wherein the content key is generated from the intermediate output.

7. The method of claim 6 further comprising:
comparing the cryptographic function I/O pair with an expected cryptographic function I/O pair uniquely associated with the cryptographic function; and
disabling playback of the encrypted content by the playback device, in response to the comparing.

8. The method of claim 6, wherein the cryptographic function is installed on the playback device according to the license of a licensee, and wherein the method further comprises:
comparing the cryptographic function I/O pair with an expected cryptographic function I/O pair uniquely associated with the cryptographic function; and
identifying the licensee, in response to the comparing.

9. A method of securely playing back an encrypted content on a playback device, the method comprising:
receiving, by the playback device, one or more keys;
executing, by the playback device, a cryptographic function using the one or more keys to generate a content key for decrypting the encrypted content; and
decrypting, by the playback device, the encrypted content using the content key;
wherein the cryptographic function is provided by a licensing entity subject to a license, wherein the playback device executes the cryptographic function subject to the license to execute the cryptographic function, and wherein the cryptographic function is unique to a manufacturer of the playback device.

10. A playback device for securely playing back an encrypted content, the playback device comprising:
a processor;
a memory communicatively coupled to the processor, the memory storing instructions including instructions for execution by the processor to:
receive one or more keys;
execute a cryptographic function using the one or more keys to generate a content key for decrypting the encrypted content; and
decrypt the encrypted content using the content key;
wherein the cryptographic function is provided by a licensing entity subject to a license, and wherein the processor executes the cryptographic function subject to the license to execute the cryptographic function, and wherein the cryptographic function is unique to the encrypted content.

11. The playback device of claim 10, wherein the cryptographic function is input/output (I/O) indistinguishable and is provided by the licensing entity for installation on the playback device without revealing the cryptographic function.

12. The playback device of claim 10, wherein the playback device is one of a class of playback devices and the cryptographic function is unique to the class of playback devices, wherein the class is defined according to a specific geographical location in which the playback device is used.

13. The playback device of claim 10, wherein the encrypted content is provided by a content provider, and the cryptographic function is unique to the content provider.

14. The playback device of claim 10, wherein the cryptographic function is provided to the playback device by a content provider with the encrypted content and a license file including the one or more keys.

15. A playback device for securely playing back an encrypted content, the playback device comprising:
a processor;
a memory communicatively coupled to the processor, the memory storing instructions including instructions for execution by the processor to:
receive one or more keys;
execute a cryptographic function using the one or more keys to generate a content key for decrypting the encrypted content; and
decrypt the encrypted content using the content key;
wherein the cryptographic function is provided by a licensing entity subject to a license, wherein the processor executes the cryptographic function subject to the license to execute the cryptographic function, and wherein executing the cryptographic function includes:
generating an intermediate input based on the one or more keys; and
generating an intermediate output based on the intermediate input;

wherein the intermediate input and intermediate output together comprise a cryptographic function input/output (I/O) pair uniquely associated with the cryptographic function, and wherein the content key is generated from the intermediate output.

16. The playback device of claim 15, wherein the memory further storing instructions including instructions for execution by the processor to:
   compare the cryptographic function I/O pair with an expected cryptographic function I/O pair uniquely associated with the cryptographic function; and
   disable playback of the encrypted content by the playback device, in response to the comparing.

17. The playback device of claim 15, wherein the cryptographic function is installed on the playback device according to the license of a licensee, and wherein the memory further storing instructions including instructions for execution by the processor to:
   compare the cryptographic function I/O pair with an expected cryptographic function I/O pair uniquely associated with the cryptographic function; and
   identify the licensee, in response to the comparing.

18. A playback device for securely playing back an encrypted content, the playback device comprising:
   a processor;
   a memory communicatively coupled to the processor, the memory storing instructions including instructions for execution by the processor to:
      receive one or more keys;
      execute a cryptographic function using the one or more keys to generate a content key for decrypting the encrypted content; and
      decrypt the encrypted content using the content key;
   wherein the cryptographic function is provided by a licensing entity subject to a license, wherein the processor executes the cryptographic function subject to the license to execute the cryptographic function, and wherein the cryptographic function is unique to the manufacturer of the playback device.

* * * * *